US010137364B2

(12) United States Patent
Schmitz (10) Patent No.: US 10,137,364 B2
(45) Date of Patent: Nov. 27, 2018

(54) GAME CONTROLLER WITH REMOVABLE MAGNETIC BUTTON

(71) Applicant: Microsoft Technology Licensing, LLC, Redmond, WA (US)

(72) Inventor: Aaron Schmitz, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 337 days.

(21) Appl. No.: 14/734,970

(22) Filed: Jun. 9, 2015

(65) Prior Publication Data

US 2016/0361635 A1 Dec. 15, 2016

(51) Int. Cl.
*A63F 13/24* (2014.01)
*A63F 13/21* (2014.01)
*A63F 13/22* (2014.01)
*A63F 13/218* (2014.01)

(52) U.S. Cl.
CPC .............. *A63F 13/24* (2014.09); *A63F 13/21* (2014.09); *A63F 13/218* (2014.09); *A63F 13/22* (2014.09)

(58) Field of Classification Search
CPC .......... A63F 13/00; A63F 13/02; A63F 13/06; A63F 13/22; A63F 13/24
USPC ..................................................... 463/36, 37
See application file for complete search history.

(56) References Cited

U.S. PATENT DOCUMENTS

| 5,607,158 A | 3/1997 | Chan |
| 5,995,034 A | 11/1999 | Liu |
| 6,102,802 A * | 8/2000 | Armstrong .............. A63F 13/06 463/37 |
| 6,135,886 A * | 10/2000 | Armstrong .............. A63F 13/06 463/37 |
| 6,510,048 B2 | 1/2003 | Rubenson et al. |
| 6,659,870 B2 | 12/2003 | Sobota |

(Continued)

FOREIGN PATENT DOCUMENTS

| CA | 2913093 A1 | 11/2014 |
| CN | 103474291 A | 12/2013 |

(Continued)

OTHER PUBLICATIONS

"How Dreamcast Works" written by Jeff Tyson, published on or before Oct. 19, 2000, accessible and printed from URL <https://electronics.howstuffworks.com/dreamcast.htm/printable>, 11 pages.*

(Continued)

*Primary Examiner* — Jason Skaarup
(74) *Attorney, Agent, or Firm* — Alleman Hall Creasman & Tuttle LLP (57) ABSTRACT

A game controller includes an electronic input sensor and a button-retention feature. The button-retention feature is configured to removably affix a selected button accessory to the game controller through a magnetic attraction between the button-retention feature and the selected button accessory. The selected button accessory is one of a plurality of differently configured button accessories removably affixable to the game controller. The selected button accessory is configured to translate a touch applied to the selected button accessory to an actuation of the electronic input sensor when the selected button accessory is affixed to the game controller.

18 Claims, 8 Drawing Sheets

(56) References Cited

U.S. PATENT DOCUMENTS

| | | |
|---|---|---|
| 7,387,573 B2 | 6/2008 | Silverbrook et al. |
| 7,758,424 B2 | 7/2010 | Riggs et al. |
| 7,927,216 B2 | 4/2011 | Ikeda et al. |
| 8,096,884 B2 | 1/2012 | Beadell et al. |
| 8,100,772 B2 | 1/2012 | Sternberg et al. |
| 8,241,126 B2 | 8/2012 | Ambinder et al. |
| 8,634,873 B2 | 1/2014 | Jones et al. |
| 8,784,208 B2 | 7/2014 | Borrel |
| 2001/0008848 A1* | 7/2001 | Armstrong ............ A63F 13/06 463/37 |
| 2002/0000975 A1 | 1/2002 | Perkins et al. |
| 2003/0193416 A1 | 10/2003 | Ogata et al. |
| 2005/0255915 A1* | 11/2005 | Riggs .................... A63F 13/06 463/37 |
| 2006/0025217 A1 | 2/2006 | Hussaini et al. |
| 2009/0054146 A1* | 2/2009 | Epstein ................. A63F 13/06 463/38 |
| 2009/0088250 A1 | 4/2009 | Carlson et al. |
| 2009/0239665 A1 | 9/2009 | Minuto et al. |
| 2010/0087252 A1 | 4/2010 | Tan et al. |
| 2010/0261514 A1 | 10/2010 | Gramelspacher et al. |
| 2011/0105231 A1* | 5/2011 | Ambinder .............. A63F 13/24 463/38 |
| 2012/0274563 A1* | 11/2012 | Olsson .................. G05G 9/047 345/161 |
| 2013/0257717 A1 | 10/2013 | Tian et al. |
| 2014/0049911 A1* | 2/2014 | Corbin ................ A45C 13/002 361/679.58 |
| 2014/0121023 A1 | 5/2014 | Tahara et al. |
| 2015/0194279 A1* | 7/2015 | Rubio ................... H01H 13/14 200/331 |
| 2016/0228765 A1 | 8/2016 | Rubio |
| 2016/0320858 A1* | 11/2016 | Rubio ..................... A63F 13/24 |
| 2016/0320859 A1* | 11/2016 | Rubio ..................... A63F 13/24 |

FOREIGN PATENT DOCUMENTS

| | | |
|---|---|---|
| CN | 103681065 A | 3/2014 |
| EP | 1380924 A1 | 1/2004 |
| EP | 3053635 A1 | 8/2016 |
| FR | 3032355 A1 | 8/2016 |
| FR | 3032355 B1 | 2/2017 |
| FR | 3016226 B1 | 3/2017 |
| FR | 3020762 B1 | 12/2017 |
| WO | 2014051515 A1 | 4/2014 |

OTHER PUBLICATIONS

ISA European Patent Office, International Search Report and Written Opinion Issued in Application No. PCT/US2016/032236, dated Aug. 18, 2016, WIPO, 12 Pages.

"The Razer Sabertooth gaming controller for the Xbox 360/PC," YouTube Website, Available Online at https://www.youtube.com/watch?feature=player_embedded&v=aaRDGV1Ryr8, Jun. 10, 2013, 5 pages.

Leclair, Dave, "Sinister: The PC Game Controller Reinvented", Published on: Feb. 10, 2014, Available at: http://www.gizmag.com/sinister-game-controller/30775/.

Witcombe, Jon, "New Sony Ps3 Move Patent Reveals Possible Update to Controllers", Published on: Jan. 14, 2013, Available at: http://www.gadgethelpline.com/sony-ps3-move-patent-reveals-update-controllers/.

Goldman, Tom, "Modular Xbox 360 Controller Fabricated With Bag of Rice", Published on: Jun. 9, 2010, Available at: http://www.escapistmagazine.com/news/view/101205-Modular-Xbox-360-Controller-Fabricated-With-Bag-of-Rice.

"Modular Gamepad: Swappable Controls, any Console", Aug. 21, 2014, Available at: http://hackaday.io/project/2782-modular-gamepad-swappable-controls-any-console.

M.L., Rey , "Rat Pro X Gaming Mouse Boasts Swappable Sensors", Retrieved on: Mar. 25, 2015, Available at: http://inventorspot.com/articles/rat-pro-x-gaming-mouse-boasts-swappable-sensors.

"Generic Thumbies Game Button Touch Screen Controllers for iPhone / iPod Touch", Published on: Jan. 2, 2014 Available at: http://www.amazon.com/Generic-Thumbies-Button-Screen-Controllers/dp/B00BNOQK1U.

"Razer Sabertooth—Gaming Controller for Xbox 360", Published on: Jan. 4, 2013 Available at: http://www.razerzone.com/gaming-controllers/razer-sabertooth.

"Aim Controllers PS4", Aim Controllers Twitter page, Twitter website, https://twitter.com/AimControllerss?lang=en, Sep. 2, 2014, 2 pages.

"Official Controller discussion", First Person Shooter Forum—FPS Discussion Forum, fps247 website, http://fps247.com/threads/official-controller-discussion.94509/, Dec. 20, 2014, 16 pages.

* cited by examiner

GAME CONTROLLER WITH REMOVABLE MAGNETIC BUTTON

BACKGROUND

A game controller may be used to provide user input to control an object or a character in a video game. A game controller may include various types of controls that may be configured to be manipulated by a finger to provide different types of user input. Non-limiting examples of such controls may include push buttons, triggers, touch pads, joysticks, paddles, bumpers, and directional pads.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A game controller includes an electronic input sensor and a button-retention feature. The button-retention feature is configured to removably affix a selected button accessory to the game controller through a magnetic attraction between the button-retention feature and the selected button accessory. The selected button accessory is one of a plurality of differently configured button accessories removably affixable to the game controller. The selected button accessory is configured to translate a touch applied to the selected button accessory to an actuation of the electronic input sensor when the selected button accessory is affixed to the game controller.

DETAILED DESCRIPTION

User input control devices, such as game controllers, may be shaped/sized to fit an average hand size of a population of users. Likewise, finger-manipulatable controls (e.g., push buttons, triggers, joysticks, directional pads) that are integral to a game controller have traditionally been designed according to a "one size fits all" approach. However, different users may have different preferences on the shape, size, color, texture, or other attributes of such controls.

The present disclosure is directed to a customizable game controller that includes one or more finger manipulatable push button accessories that can be swapped out in a tool-free manner. More particularly, the game controller may be configured to facilitate a selected button accessory to be removably affixed to the game controller through a magnetic attraction between a button-retention feature of a mounting platform of the game controller and the selected button accessory. By employing cooperating magnetic components in the mounting platform and the differently configured button accessories, the differently configured button accessories may be quickly and easily swapped without the use of tools.

For example, such a configuration may facilitate the use of differently configured removable button accessories that may be quickly swapped when switching between playing different video games. In another example, such a configuration may facilitate the use of differently configured removable button accessories that may be quickly swapped when the game controller is used by different players.

Figure 1:
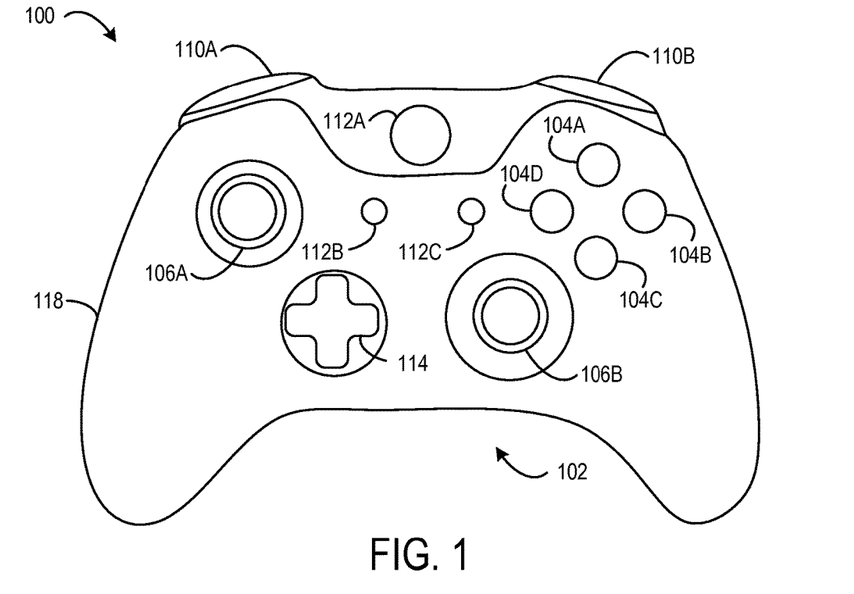
FIG. 1 shows a front of an example game controller with removable button accessories affixed to the game controller.
Figure 2:
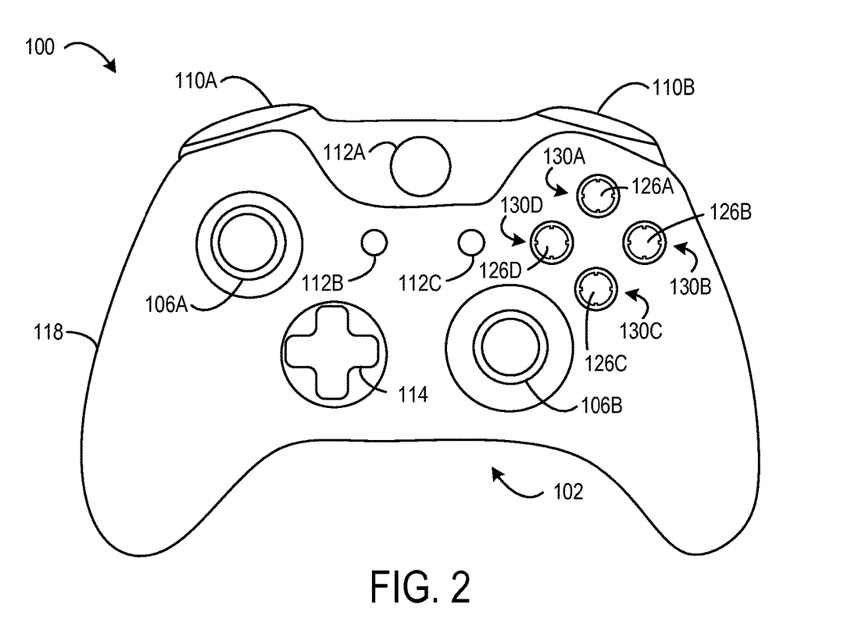
FIG. 2 shows the game controller of FIG. 1 without the removable button accessories affixed to the game controller.
Figure 3:
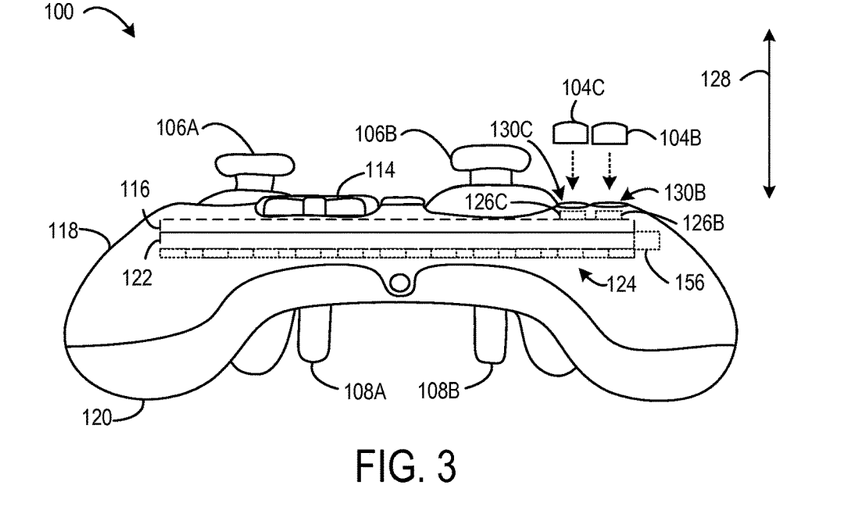
FIG. 3 shows a bottom of the game controller of FIG. 1 with removable button accessories aligned to be removably affixed to corresponding mounting platforms.

FIGS. 1-3 show an example user input control device in the form of a game controller 100. The game controller 100 may be configured to translate user input into control signals that are output to a computing device, such as a gaming console. The control signals may be mapped to commands to control a video game or perform other operations. For example, the game controller 100 may be configured to send control signals via a wired or wireless connection with a computing device.

The game controller 100 includes a plurality of controls 102 configured to generate different control signals responsive to finger manipulation. The plurality of controls 102 may include a plurality of removable push buttons 104 (e.g., 104A, 104B, 104C, 104D), a plurality of joysticks 106 (e.g., a left joystick 106A and a right joystick 106B), a plurality of triggers 108 (e.g., a left trigger 108A and a right trigger 108B), a plurality of bumpers 110 (e.g., left bumper 110A and right bumper 110B), a plurality of actions buttons 112 (e.g., 112A, 112B, 112C), and a directional pad 114. The plurality of controls 102 may be coupled to a frame 116. The frame 116 may be contained collectively within an upper housing portion 118 and a lower housing portion 120 of the game controller 100. In other words, the upper housing portion 118 and the lower housing portion 120 may cooperate to form a housing that contains at least a portion of each of the plurality of controls 102 that are coupled to the frame 116.

A printed circuit board 122 may be coupled to the frame 116. The printed circuit board 122 may include a plurality of electronic input sensors 124. Each electronic input sensor may be configured to actuate responsive to interaction with a corresponding control. Non-limiting examples of electronic input sensors may include collapsible switches such as dome switches and tactile switches, Hall Effect sensors, potentiometers, and other electronic sensing components. Any suitable sensor may be implemented in the game controller 100. In some implementations, two or more printed circuit boards may be used. The game controller 100 may include any number of controls, any type of controls, any number of electronic input sensors, and any type of electronic input sensors without departing from the scope of this disclosure.

In the depicted implementation, the plurality of removable push buttons 104 (also referred to herein as button accessories) are the only type of control on the game controller 100 that are removable without the use of tools. In some implementations, the game controller 100 may include other types of controls (e.g., joystick, directional pad, triggers) that may be removed/swapped tool free.

Different removable push buttons 104 may have different sizes, shapes, textured surfaces, colors, artwork, and other features that are preferred by different users or may be suited for particular gaming or other purposes.

The game controller 100 includes a mounting platform 126 (e.g., 126A, 126B, 126C, 126D) configured to interface with a selected button accessory 104 (e.g., 104A, 104B, 104C, 104D). In particular, the plurality of button accessories 104 may interface with the plurality of mounting platforms 126 in alignment with an axis 128. In the illustrated example, the axis 128 is aligned with a direction in which the plurality of button accessories are depressible.

In the illustrated example, the upper housing portion 118 defines a plurality of apertures 130 (e.g., 130A, 130B, 130C, 130D), and the plurality of mounting platforms 126 may be recessed within the plurality of apertures 130. By recessing the plurality of mounting platforms 126 within the apertures 130, a seam created between the selected button accessory 104 and the mounting platform 126 may be protected from external elements. Moreover, the mounting platform 126 may be configured to interface with the upper housing portion 118 to create a seal that prevents external elements from entering an interior of the game controller 100.

In some implementations, one or more of the plurality of mounting platforms 126 may be flush with the upper housing portion 118. In some implementations, one or more of the plurality of mounting platforms 126 may protrude from the upper housing portion 118.

Figure 4:
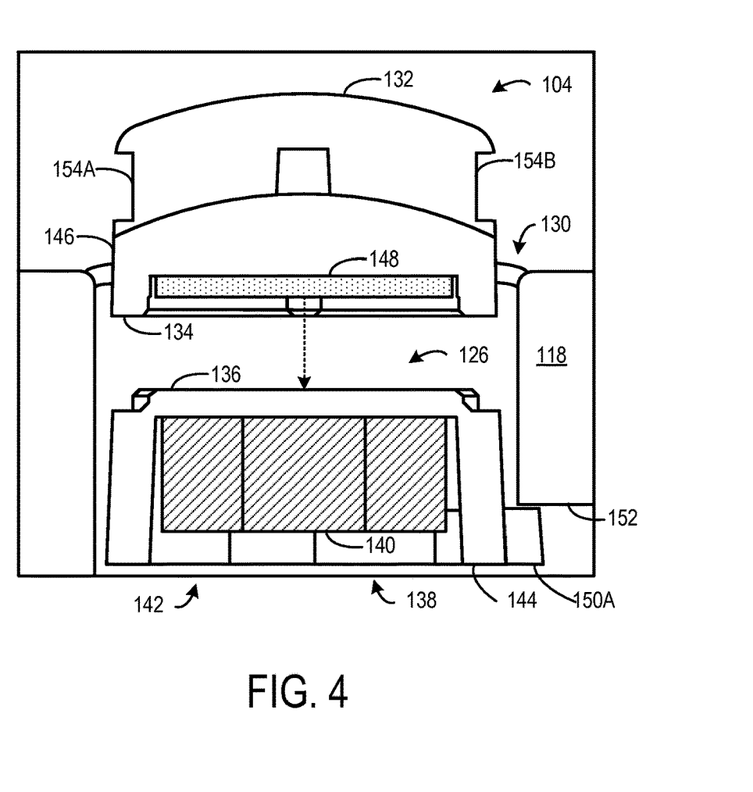
FIG. 4 shows a cross-section of a selected button accessory aligned to be affixed to a mounting platform of the game controller of FIG. 1.

FIG. 4 shows a selected mounting platform 126 and a selected button accessory 104 aligned to be affixed to the mounting platform 126. The selected button accessory 104 may include a topside 132 and an underside 134 that is opposite the topside 132. The topside 132 may include any suitable surface, feature, shape, and/or structure configured to be touched and/or manually manipulated by a finger. The underside 134 may include any suitable surface, feature, shape, and/or structure configured to selectively mate with the mounting platform 126 to removably affix the selected button accessory 104 to the game controller 100. For example, the underside 134 of the selected button accessory 104 may have a shape that complements a shape of a topside 136 of the mounting platform 126. Such corresponding interfaces may aid the selected button accessory 104 in aligning with the mounting platform 126 to removably affix the selected button accessory 104 to the game controller 100.

Furthermore, the mounting platform 126 may include one or more button-retention features 138 configured to removably affix the selected button accessory 104 to the game controller 100 without the use of tools. In particular, the button-retention feature 138 may have a magnetic attraction to at least a portion of the selected button accessory 104 to affix the selected button accessory 104 to the mounting platform 126. Moreover, the one or more button-retention features 138 of the mounting platform 126 may allow for various differently configured button accessories to be quickly and easily affixed to the mounting platform 126 without the use of tools.

In the illustrated example, the button-retention feature 138 includes a magnet 140 secured within a cavity 142 formed on an underside 144 of the mounting platform 126. The cavity 142 may have a depth to accommodate the magnet 140 such that the magnet is at least flush (or recessed) with the underside 144 of the mounting platform 126. The magnet 140 may be coupled to the cavity 142 in any suitable manner. For example, the magnet 140 may be coupled to the cavity 142 using pressure-sensitive adhesive.

In another example, the magnet 140 may be secured to the topside 136 of the mounting platform 126 such that the magnet 140 is exposed to the selected button accessory 104. The button-retention feature 138 may include any number of magnets, any shape of magnet(s), and/or any arrangement of magnet(s).

In some implementations, a button-retention feature may be positioned elsewhere in the game controller 100 instead of included in the mounting platform 126. For example, a button-retention feature may be positioned adjacent the aperture 130 within the upper housing portion 118. In another example, a button-retention feature may be mounted to the frame 116. In another example, a button-retention feature may be coupled to another static component of the game controller 100.

In some implementations, the mounting platform 126 may be omitted from the game controller 100. Instead, in one example, a button-retention feature may be configured to removably affix the selected button accessory 104 to the game controller 100 through a magnetic attraction between the button-retention feature and the selected button accessory 104. In such implementations, the selected button accessory 104 may be configured to translate a touch applied to the selected button accessory 104 to an actuation of the electronic input sensor 124 when the selected button accessory 104 is affixed to the game controller 100. In such implementations, the selected button accessory 104 may include a sensor actuation feature configured to interact with the electronic input sensor 124 to actuate the electronic input sensor 124 responsive to the touch applied to the selected button accessory 104 when the selected button accessory 104 is affixed to the game controller 100.

Further, in the illustrated example, the selected button accessory 104 includes an assembly including a cap 146 and a steel plate 148 secured on an underside of the cap 146. The steel plate 148 may have a magnetic attraction to the magnet 140 to removably affix the selected button accessory 104 to the mounting platform 126. In some implementations, the steel plate 148 may be secured to the cap 146 via an adhesive. In some implementations, the steel plate 148 may be secured to the cap via an injection molding process in which the steel plate 148 is partially or completely embedded within the cap 146. In the illustrated example, the steel plate 148 may be recessed from the underside 134 of the selected button accessory 104. In some implementations, the steel plate 148 may be flush with the underside 134 of the selected button accessory 104. In one particular example, the steel plate may include a central portion and a perimeter ring, and the perimeter ring may have a depth that is less than the central portion such that the perimeter ring is recessed from the underside 134 of the selected button accessory relative to the central portion. In particular, the perimeter ring may be recessed relative to the central portion to allow a plastic over-mold of the cap 146 to encase the perimeter ring in order to secure the steel plate 148 to the cap 146 and allow the central portion of the steel plate 148 to be flush with the underside 134.

In some implementations, the steel plate 148 may be replaced with a plate (or other part) made of a different ferromagnetic material. In some implementations, the selected button accessory 104 may be a single ferromagnetic metal part. For example, the metal part may be metal injection-molded. In another example, the part may be machined from a single piece of metal. In another example, the part may be formed from sheet metal. In some implementations, the selected button accessory 104 may be an assembly including one or more ferromagnetic parts.

In some implementations, the button-retention feature 138 may include ferromagnetic material, and the selected button accessory 104 may include one or more magnets having a magnetic attraction to the ferromagnetic material of the button-retention feature 138. In other words, such an implementation may be the inverse of the depicted implementation.

In some implementations, the mounting platform 126 and the selected button accessory 104 each may include cooperating magnets having a magnetic attraction that allows the selected button accessory 104 to be removably affixed to the mounting platform 126.

The mounting platform 126 may include a plurality of securement tabs 150 (e.g., 150A, 150B, 150C) that extend outward radially from the mounting platform 126. In particular, the plurality of securement tabs 150 may extend outward beyond the aperture 130 and underneath an interior surface 152 of the upper housing portion 118 to secure the mounting platform 126 within the game controller 100. The plurality of securement tabs 150 may be configured to prevent the mounting platform 126 from rotating within the controller 100. Note that an interface between the plurality of securement tabs 150 and the upper housing portion 118 may allow the mounting platform 126 to actuate responsive to a touch being applied to the selected button accessory 104 when the selected button accessory 104 is removably affixed to the mounting platform 126. In the illustrated example, the mounting platform 126 interfaces with the upper housing portion 118. The mounting platform 126 may interface with any suitable static part of the game controller 100. For example, in some implementations, the mounting platform 126 may interface with a portion of the frame 116.

In some implementations, the selected button accessory 104 may include a plurality of grip notches 154 (e.g., 154A, 154B). The plurality of grip notches 154 may be configured to be gripped by fingers of a user to facilitate easy removal of the selected button accessory 104 from the mounting platform 126. The selected button accessory 104 may include any suitable number of grip notches 154, including zero grip notches.

Figure 5:
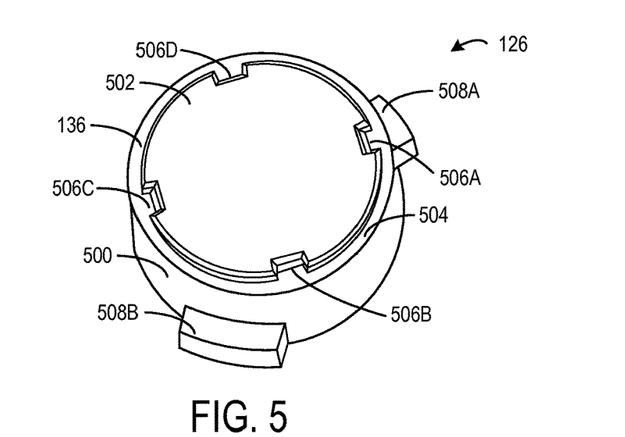
FIGS. 5-7 show an example mounting platform of the game controller of FIG. 1.
Figure 6:
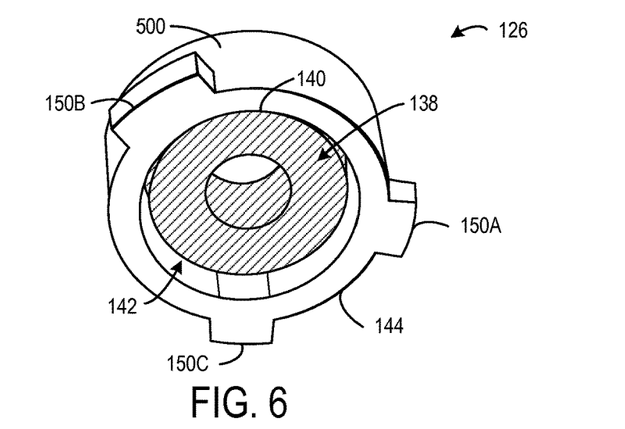
Figure 7:
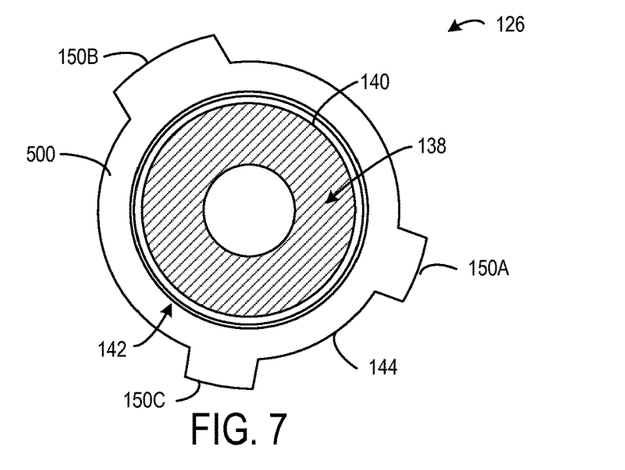

FIGS. 5-7 show the mounting platform 126. In the depicted example, the mounting platform 126 includes a base piece 500 and a protrusion 502 that extends upward from the base piece 500. The base piece 500 may be circular and the protrusion 502 may be circular such that a diameter of the protrusion is less than a diameter of the base piece 500. This configuration may create a rim 504 around the perimeter of the circular base piece 500 that may act as a seat to align the selected button accessory 104 with the mounting platform 126 when the selected button accessory 104 is removably affixed to the mounting platform 126.

In some implementations, the base piece 500 and/or the protrusion 502 may have non-circular shapes. For example, the base piece 500 and/or the protrusion 502 may include a triangle, square, star, or other shape. In some implementations, the base piece 500 may have a shape that differs from a shape of the protrusion 502. For example, the base piece 500 may be square and the protrusion 502 may be a circle.

The protrusion 502 may include a plurality of mating features 506 (e.g., 506A, 506B, 506C) configured to interlock with a corresponding plurality of mating features 802 on the selected button accessory 104 to prevent the selected button accessory 104 from rotating about the mounting platform 126. In the depicted example, the plurality of mating features 506 are rectangular cutouts spaced apart around the perimeter of the protrusion 502. The mounting platform 126 may include any suitable number of mating features 506, including no mating features. Moreover, the plurality of mating features 506 may have any suitable shape, and/or arrangement on the mounting platform 126.

In the depicted implementation, the magnet 140 is a hollowed out cylinder. In some implementations, the magnet 140 may be a different shape. For example, the magnet 140 may be a cylinder, a cube, a plate, or another shape. In another example, the magnet 140 may be a multi-pole magnet. In some implementations, the multi-pole magnet may be configured to at least partially aid in aligning the selected button accessory 104 in a selected orientation relative to the mounting platform 126. In some implementations, the mounting platform 126 may include a plurality of magnets that collectively produce a magnetic field.

In the depicted implementation, the magnet 140 may be oriented such that a pole of the magnet 140 is coaxial with an axis of the selected button accessory 104 when the selected button accessory 104 is affixed to the mounting platform 126. In other implementations, the magnet 140 may be configured such that a pole of the magnet 140 is transverse to the axis of the selected button accessory 104 when the selected button accessory 104 is affixed to the mounting platform 126.

Figure 8:
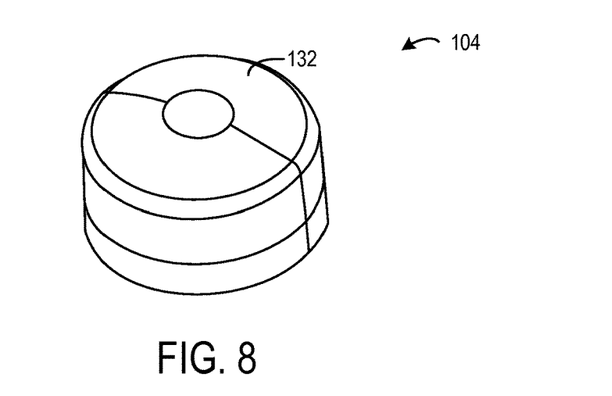
FIGS. 8-10 show an example button accessory removably affixable to the game controller of FIG. 1.
Figure 9:
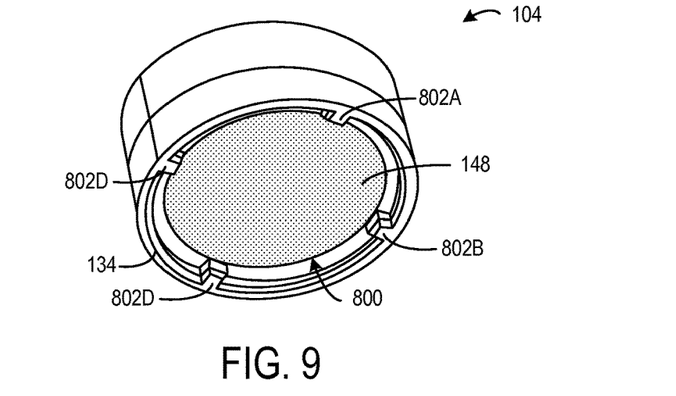
Figure 10:
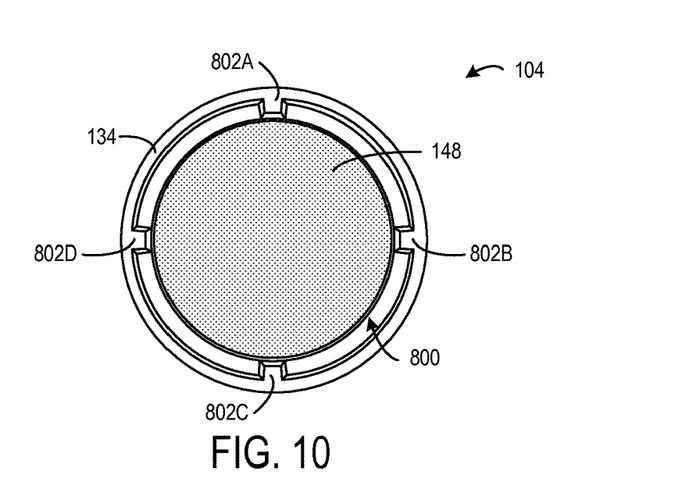

FIGS. 8-10 show the selected button accessory 104. The selected button accessory 104 is cylindrical, and the topside 132 is smooth and round. The underside 134 of the selected button accessory 104 may be configured to have a shape that complements the shape of the protrusion 502 of the mounting platform 126. In particular, the underside 134 of the selected button accessory 104 may form a cavity 800 sized slightly larger than the protrusion 502 such that when the selected button accessory 104 is affixed to the mounting platform 126, the cavity 800 covers the protrusion 502. In one example, the height of the protrusion 502 may be at least as great as a depth of the cavity 800 such that when the selected button accessory 104 is affixed to the mounting platform 126, the steel plate 148 rests on the protrusion 502.

In some implementations, the selected button accessory 104 may include a protrusion that complements a shape of a cavity formed in the mounting platform 126 to affix the selected button accessory 104 to the mounting platform 126. The selected button accessory 104 and the mounting platform 126 may include any complimentary features that allow the selected button accessory 104 to affix to the mounting platform 126.

Other button accessories may be a different shape and/or may include a topside having a different shape. For example, the topside 132 may include a concave dish. In another example, the topside 132 may include different textures including smooth textures, rough textures, or other suitable textures. Some textures may be formed from different material coatings applied to the button accessory. Other textures may be formed by a structure of the button accessory itself. In another example, different button accessories may have different textural indicators (e.g., ridges, bumps, depressions) to differentiate between different button accessories. In some implementations, different button accessories may have different heights such that the different button accessories protrude a greater distance or a lesser distance from the game controller 100. In some implementations, different button accessories may include different materials. Non-limiting examples of different materials that may be included in different button accessories include metal, rubber, and plastic.

Furthermore, the selected button accessory 104 includes a plurality of mating features 802 (e.g., 802A, 802B, 802C, 802D) configured to interlock with the corresponding plurality of mating features 506 of the mounting platform 126 to prevent the selected button accessory 104 from rotating about the mounting platform. In the depicted example the plurality of mating features 802 are rectangular peninsulas that extend inward from a perimeter of the underside 134 into the cavity 800. A button accessory may include any number of mating features having any shape and/or size to interlock with corresponding mating features 802 of one or more of the plurality of mounting platforms 126.

In some implementations, additionally or alternatively, the upper housing portion 118 of the game controller 100 may define a mating feature configured to interlock with a corresponding mating feature of a selected button accessory to prevent the selected button accessory from rotating about the mounting platform. In the example depicted in FIGS. 11-12, the upper housing portion 118 defines a slot 1100 adjacent an aperture 1102 in which the mounting platform 126 (shown in FIG. 4) is recessed. Correspondingly, the selected button accessory 1104 includes a tab 1106 that extends outward from the selected button accessory 1104. The tab 1106 may be sized to fit within the slot 1100 when the selected button accessory 1104 is affixed to the mounting platform 126. In particular, the tab 1106 must be aligned to enter the slot 1100 in order for the selected button accessory 1104 to enter the aperture 1102 to affix to the mounting platform 126. Such a configuration may ensure that the selected button accessory 1104 affixes to the mounting platform 126 in a particular orientation and prevents the selected button accessory 1104 from rotating to a different orientation.

Figure 11:
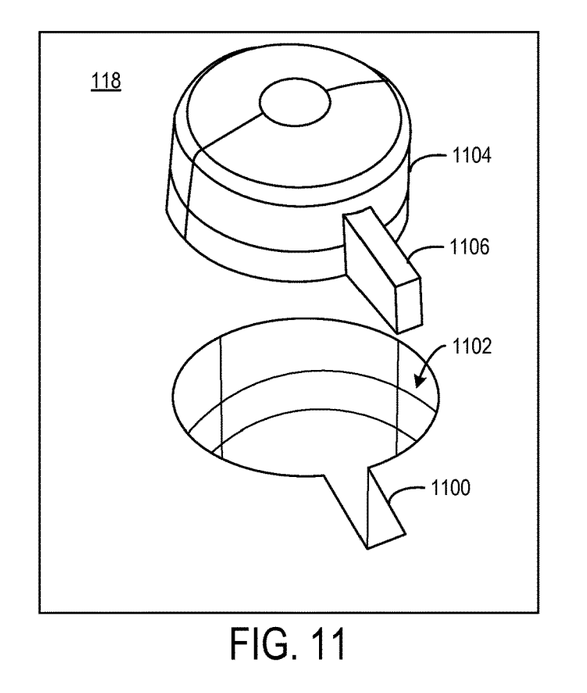
FIGS. 11-12 show a selected button accessory including a mating feature interacting with a mating feature of a housing portion of a game controller.
Figure 12:
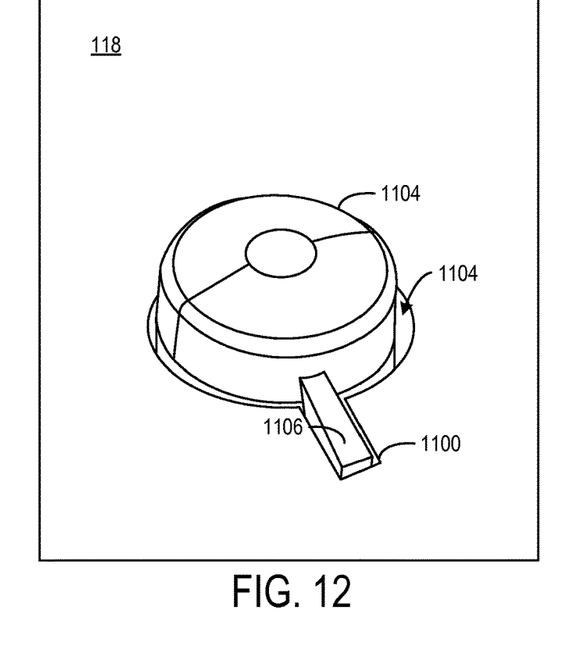

The mating slot 1100 and cooperating tab 1106 may take any suitable form. In some implementations, the upper housing portion 118 and the selected button accessory 1104 each may include two or more cooperating mating features.

The above described mating configuration may be particularly applicable to implementations of the game controller 100 in which the mating platform 126 is omitted, the selected button accessory 104 is affixable to the game controller 100 through a magnetic attraction with a button-retention feature that is positioned elsewhere in the game controller 100, and the selected button accessory 104 actuates the electronic input sensor 124 directly.

In some implementations, one or more mating slots may be formed in a selected button accessory, and the mounting platform, the upper housing portion, or another component of the game controller that is separate from the mounting platform may include one or more complimentary mating features configured to extend into the one or more mating slots of the selected button accessory to prevent the selected button accessory from rotating on the mounting platform. The selected button accessory 104 may interact with any component of the game controller 100 in any manner to prevent the selected button accessory 104 from rotating on the mounting platform 126.

As discussed above, the mounting platform 126 may be configured to translate a touch applied to the selected button accessory 104 to an actuation of a corresponding electronic input sensor 124 when the selected button accessory 104 is affixed to the mounting platform 126. In one example shown in FIGS. 13-14, the electronic input sensor includes a collapsible switch 1300. The collapsible switch 1300 may be mounted to the printed circuit board 122. In particular, the collapsible switch may include a contact 1302 positioned on the printed circuit board 122 and a collapsible portion 1304 having an underside 1306 that includes a conductive material (e.g., carbon). The collapsible portion 1304 may be made of rubber or some other malleable material.

Figure 13:
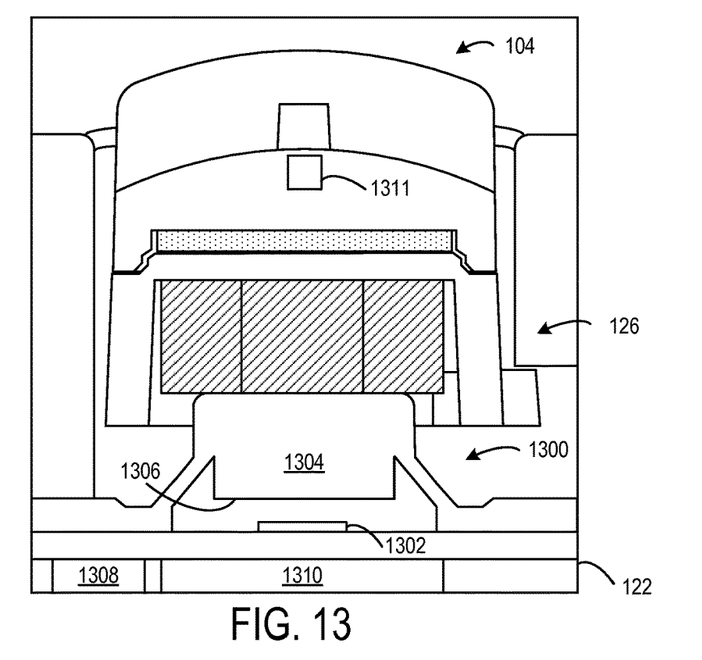
FIGS. 13-14 show a selected button accessory removably affixed to a mounting platform configured to interact with a collapsible switch.

As shown in FIG. 13, the mounting platform 126 may be configured to reside in a default posture when no touch force is applied to the selected button accessory 104. In the default posture, the mounting platform 126 merely touches the collapsible switch 1300, but does not collapse the collapsible portion 1304. Further, the collapsible portion 1304 is spaced apart from the contact 1302 such that the conductive material on the underside 1306 of the collapsible portion 1304 does not touch the contact 1302.

Figure 14:
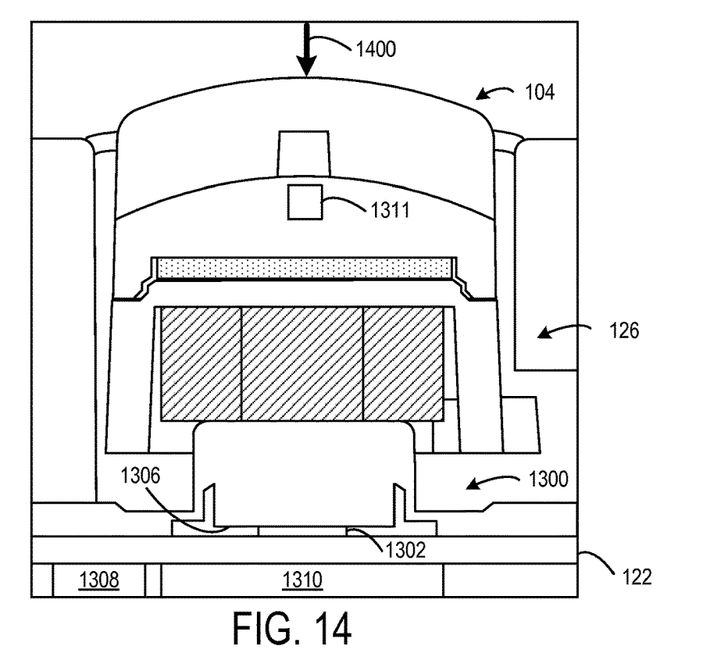

As shown in FIG. 14, the mounting platform 126 may be configured to translate a touch force 1400 applied to the selected button accessory 104 to an actuation force applied by the mounting platform 126 to actuate the collapsible switch 1300. In the depicted example, the mounting platform 126 translates downward causing the collapsible portion 1304 to collapse such that the conductive material positioned on the underside 1306 of the collapsible portion 1304 touches the contact 1302. An activation signal may be generated responsive to the conductive material on the underside 1306 of the collapsible portion 1304 touching the contact 1302.

The activation signal may be any signal that differs from a signal or lack thereof produced in the default posture. For example, in some implementations, the activation signal may correspond to a supply voltage (e.g., VDD) of the game controller 100 and the signal produced in the default state may correspond to a relative ground. (e.g., 0). In other implementations, the activation signal may correspond to a relative ground and the signal produced in the default state may correspond to the supply voltage of the game controller 100.

The collapsible switch 1300 may be configured to return to a default (e.g., uncollapsed) state responsive to the touch force 1400 being lifted from the selected button accessory 104. Correspondingly, the mounting platform 126 and the selected button accessory 104 may be returned to a default posture responsive to the collapsible switch 1300 returning to the default state.

The mounting platform 126 may be further configured such that when a removable controller accessory is not affixed to the mounting platform 126, a touch force may be applied directly to the mounting platform 126. The mounting platform 126 may be configured to translate the touch force into movement of the mounting platform 126 that applies an activation force to the collapsible switch 1300 to generate the activation signal. In other words, the mounting platform 126 may function as a push button itself when a removable button accessory is not affixed to the mounting platform 126. In one example, an activation force may include an amount of force sufficient to cause the collapsible switch 1300 to collapse. The activation force may be any suitable amount of force to actuate an electronic input sensor.

Although the mounting platform 126 may translate a touch force to an activation force, the mounting platform 126 may otherwise differ from a traditional push button. For example, the mounting platform 126 may be recessed from a surface of the upper housing portion 118 of the game controller 100 in order to accommodate a thickness of the button accessory 104. Further, the topside 136 of the mounting platform 126 may have abrupt edges that are configured to mate with the button accessory 104. In contrast, traditional push buttons may have edges and surfaces that are contoured to comfortably accommodate a user's finger.

The collapsible switch 1300 may take any suitable form. In one example, the collapsible switch 1300 may include a tactile switch. In another example, the collapsible switch 1300 may include a dome switch.

In some implementations, a magnetic shunt 1310 may be located proximate to the magnet 140 to increase the retention strength of the button-retention feature 138 or to prevent the magnetic field of the magnet 140 from interfering with other electromagnetic components of the game controller 100. In one particular example, the magnetic shunt 1310 is made of steel. In the depicted implementation, the magnetic shunt 1310 is coupled to the printed circuit board 122. Although, the magnetic shunt 1310 may be positioned at any suitable location within the game controller to alter the magnetic field produced by the mounting platform 126 or the selected button accessory 104. In some implementations, a plurality of magnetic shunts may be positioned throughout the game controller 100 to increase the retention strength of the button-retention feature 138 or to shield one or more components of the game controller 100 from the magnetic fields of the button-retention feature 138.

Figure 15:
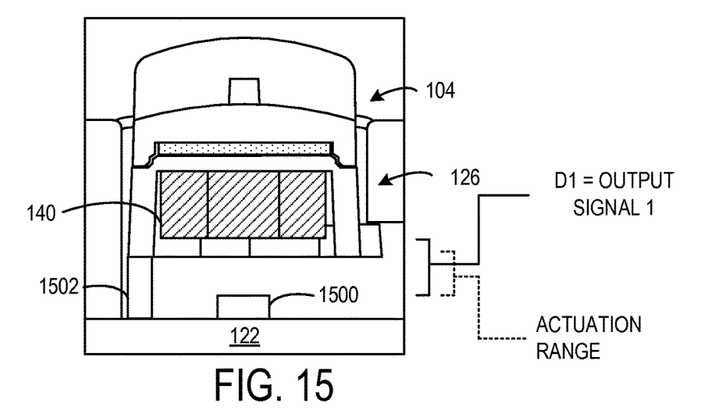
FIGS. 15-17 shows a selected button accessory removably affixed to a mounting platform configured to interact with a Hall Effect sensor.
Figure 16:
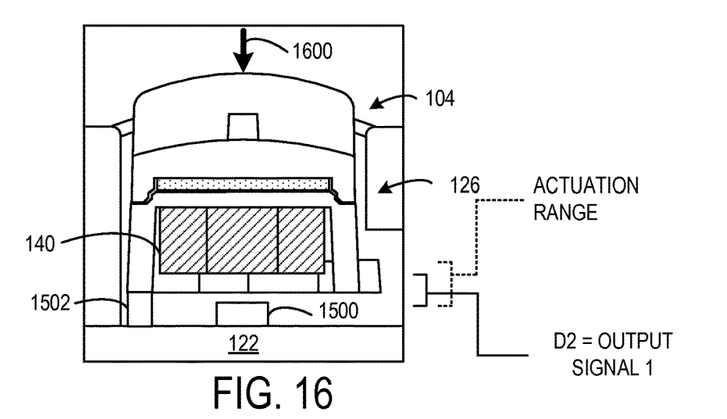
Figure 17:
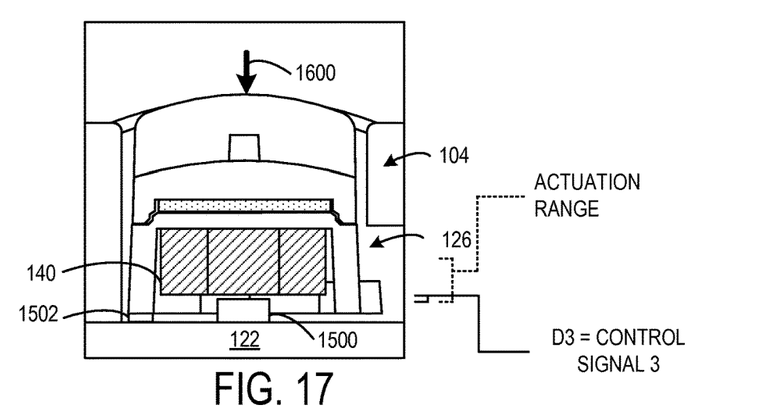

In another example shown in FIGS. 15-17, the electronic input sensor includes a Hall Effect sensor 1500. The Hall Effect sensor 1500 may be mounted to the printed circuit board 122 below the mounting platform 126. The Hall Effect sensor 1500 may be configured to vary an output signal based on a magnetic field produced by the magnet 140 of the mounting platform 126 (or a magnet in the selected button accessory 104). In particular, the Hall Effect sensor 1500 may have an actuation range in which the magnetic field may affect the output signal of the Hall Effect sensor 1500 such that the Hall Effect sensor 1500 may vary an output signal responsive to the magnet 140 entering the actuation range.

As shown in FIG. 15, when no touch is applied to the selected button accessory 104, the mounting platform 126 resides in the default posture. In the default posture, the magnet 140 is positioned above the actuation range of the Hall Effect sensor 1500 at a first distance (D1). As such, the Hall Effect sensor 1500 may produce a first output signal indicating no actuation of the push button (or may produce no output signal).

As shown in FIG. 16, the mounting platform 126 moves into the actuation range of the Hall Effect sensor 1500 responsive to a touch 1600 being applied to the selected button accessory 104 when the selected button accessory 104 is affixed to the mounting platform 126. In particular, the magnet 140 is positioned at a second distance (D2) that causes the Hall Effect sensor to produce a second output signal different than the first output signal produced when the magnet 140 was positioned at the first distance. In particular, the second output signal may indicate actuation of the push button.

As shown in FIG. 17, the mounting platform 126 moves further into the actuation range of the Hall Effect sensor 1500 responsive to the touch 1600 being further applied to the selected button accessory 104 when the selected button accessory 104 is affixed to the mounting platform 126. In particular, the magnet 140 is positioned at a third distance (D3) that causes the Hall Effect sensor to produce a third output signal different than the first and second output signals. In one example, the first output signal is 5 volts, the second output signal is 3 volts, and the third output signal is 1 volt. The Hall Effect sensor 1500 may output any suitable output signal based on a position of the magnet 140.

In some implementations, the game controller 100 may be configured to interpret the output signal produced by the Hall Effect sensor 1500 in a binary fashion to determine whether or not the push button is actuated. For example, a threshold parameter (e.g., voltage) may be set to determine whether the push button is actuated. In one example, the threshold parameter may include a voltage corresponding to a distance associated with the far edge of the actuation range. The threshold parameter may be set to any suitable value.

In some implementations, the game controller 100 may be configured to vary an output signal relative to a distance that the mounting platform 126 (or the magnet 140) moves into the actuation range of the Hall Effect sensor 1500. In such implementations, the push button may be used to provide a variable or analog input that varies based on how far the push button is depressed.

In one example, in a baseball video game, a speed at which a pitcher throws a baseball may be varied based on how much the push button is depressed. For example, the push button may be depressed a lesser distance to throw a pitch slower, or the push button may be depressed a greater distance to throw a pitch faster.

In some implementations, a return mechanism 1502 may be positioned between the mounting platform 126 and the printed circuit board 122. In particular such a return mechanism may be included in implementations that include Hall Effect sensor 1500 (or where electronic input sensor 124 does not comprise a collapsible switch). The return mechanism 1502 may be configured to allow the mounting platform 126 to translate toward the Hall Effect sensor 1500 responsive to the touch 1600 being applied to the selected button accessory 104. Further, the return mechanism 1502 may be configured to return the mounting platform 126 and the selected button accessory 104 to a default posture responsive to the touch 1600 being lifted from the selected button accessory 104. In one example, the return mechanism 1502 may include a spring. In another example, the return mechanism 1502 may include a collapsible or deformable member having similar characteristics to the collapsible switch 1300 of FIGS. 13-14. The return mechanism 1502 may include any mechanism that returns the mounting platform 126 to the default posture. In implementations of the game controller 100 in which the mating platform 126 is omitted, the return mechanism 1502 may interface directly with the selected button accessory 104 to return the selected button accessory 104 to a default posture responsive to the touch 1600 being lifted from the selected button accessory 104.

Returning to FIG. 3, in some implementations, the game controller 100 may include a button identification device 156 configured to identify a selected button accessory 104 when the selected button accessory 104 is affixed to the mounting platform 126. The button identification device 156 may be configured to associate a control signal with the identified button accessory 104. The button identification device 156 may be configured to identify any button accessory 104 that is affixed to any mounting platform 126 of the game controller 100. Further, the game controller 100 may be configured to output the control signal associated with the selected button accessory 104 responsive to actuation of the electronic input sensor 124 corresponding to the selected button accessory 104 while the selected button accessory 104 is affixed to the mounting platform 126. In some implementations, a control device other than the button identification device 156 may associate a control signal with an identified button accessory.

In one example, as shown in FIGS. 13-14, the button identification device includes a radio frequency identification (RFID) reader 1308. Further, the selected button accessory 104 may include an RFID tag 1311. The RFID reader 1308 may be configured to read the RFID tag 1311 to identify the selected button accessory 104 when the selected button accessory 104 is affixed to the mounting platform 126. The RFID reader 1308 (or other control device) may be configured to associate an identifier corresponding to the RFID tag of the selected button accessory 104 with a control signal. Furthermore, the game controller 100 may be configured to output the control signal responsive to actuation of the collapsible switch 1300 while the selected button accessory 104 is affixed to the mounting platform 126.

In another example, the button identification device 156 may be configured to identify a selected button accessory based on output signals produced by the Hall Effect sensor 1500. In particular, different button accessories may include different magnets that produce different magnetic fields identifiable by the Hall Effect sensor. For example, a first button accessory may include a first magnet that produces a magnetic field having a first magnitude that causes the Hall Effect sensor 1500 to produce a first output signal. Further, a second button accessory may include a second magnet that produces a magnetic field having a second magnitude that causes the Hall Effect sensor 1500 to produce a second output signal. The first signal and the second signal may differ based on the difference in magnitudes of the different magnetic fields. Further, the different signals may act as baseline signals that may be associated with the different button accessories.

An identified button accessory may be associated with any suitable control signal or operation. In some implementations, each differently configured button accessory may be associated with a different control signal. In some implementations, two or more differently configured button accessories may be associated with the same control signal or operation. In some examples, each identified button accessory that is affixed to the game controller 100 may be associated with a different control signal or operation. In some examples, two different identified button accessories that are affixed to the game controller 100 may be associated with a same control signal (or operation).

Figure 18:
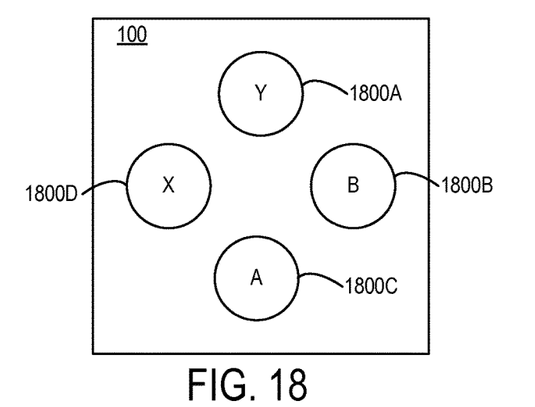
FIG. 18 shows a first set of button accessories associated with a first set of control signals.

By associating different control signals or operations with different button accessories, different button accessories may be swapped on the game controller 100 to customize the functionality of the game controller 100. In one example shown in FIG. 18, a first set of button accessories 1800 (e.g., 1800A, 1800B, 1800C, 1800D) may be affixed to the game controller 100. The first set of button accessories 1800 may be configured to perform a first set of operations. For example, the first set of button accessories 1800 may be configured for playing a first-person-shooter (FPS) video game. In particular, a first button accessory 1800A may be associated with a shoot operation, a second button accessory 1800B may be associated with a reload weapon operation, a third button accessory 1800C may be associated with a switch weapon operation, and a fourth button accessory 1800D may be associated with an aim weapon operation. The first set of button accessories 1800 may be affixed to the game controller 100 any time a user plays a FPS video game. In some examples, the operations associated with the button accessories may be more specific to the particular video game. In other examples, the operations associated with the button accessories may be less specific to the particular video game. For example, the first set of button accessories may be a default set of button accessories.

Figure 19:
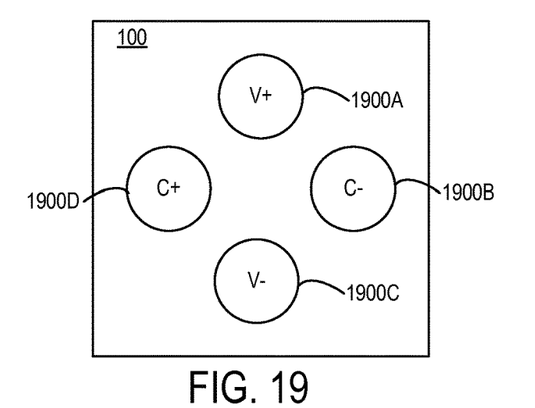
FIG. 19 shows a second set of button accessories associated with a second set of control signals different than the first set of control signals.

In another example shown in FIG. 19, a second set of button accessories 1900 (e.g., 1900A, 1900B, 1900C, 1900D) may be affixed to the same game controller 100. The second set of button accessories may be configured to perform a second set of operations that differs from the first set of operations of the first set of button accessories 1800. For example, the second set of button accessories 1900 may be configured for watching television. In particular, a first button accessory 1900A may be associated with an increase sound volume operation, a second button accessory 1900B may be associated with a decrease channel operation, a third button accessory 1900C may be associated with a decrease sound volume operation, and a fourth button accessory 1900D may be associated with an increase channel operation. The second set of button accessories 1900 may be affixed to the game controller 100 any time a user watches television. Moreover, the second set of button accessories 1900 and the first set of button accessories may be easily swapped on the game controller 100 when a user goes from watching television to playing a FPS video game.

In some examples, a same set of button accessories may be rearranged on the game controller 100 to customize which push buttons perform which operations. For example, the first button accessory 1900A and the second button accessory 1900B could be swapped to make the two volume controls adjacent and the two channel controls adjacent on the game controller 100.

Although the above examples describe operations as being grouped into particular sets, any individual button accessory may be affixed to the game controller 100 to customize a particular operation.

Returning to FIGS. 2-3, in some implementations, the plurality of mounting platforms 126 may be configured such that a same selected button accessory 104 may be removably affixable to each of the plurality of mounting platforms 126. For example, the different mounting platforms may include the same mating features. In some implementations, the plurality of mounting platforms 126 may be identical. Correspondingly, in some implementations, every button accessory 104 may include an underside 134 that is configured in the same manner such that any button accessory 104 may affix to any of the plurality of mounting platform 126. For example, the different button accessories may include the same mating features.

In other implementations, two or more mounting platforms of the plurality of mounting platforms 126 may be differently configured such that a same selected button accessory 104 is not removably affixable to the two or more mounting platforms. For example, the different mounting platforms 126 may include differently configured mating features that are compatible with button accessories having cooperating mating features.

In other implementations, two or more mounting platforms of the plurality of mounting platforms 126 may be configured such that a first button accessory is removably affixable to a first mounting platform, and the first button accessory is not removably affixable to a second mounting platform. Further, a second button accessory that is differently configured than the first button accessory may be removably affixable to the first mounting platform and the second mounting platform.

Figure 20:
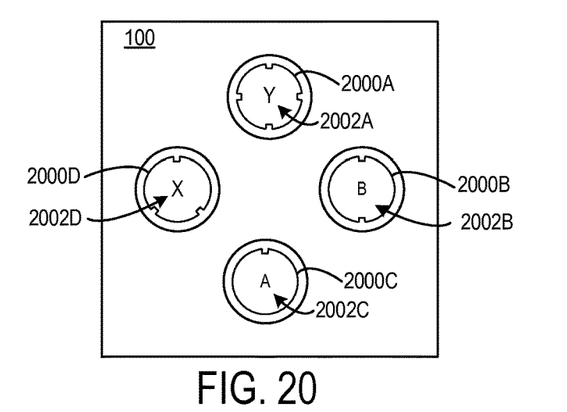
FIG. 20 shows a plurality of mounting platforms each having different mating features and a different visual identifier.

In one example shown in FIG. 20, a plurality of mounting platforms 2000 (e.g., 2000A, 2000B, 2000C, 2000D) of the game controller 100 each include a differently configured set of mating features. In particular, a first mounting platform 2000A includes four mating features, a second mounting platform 2000B includes two mating features, a third mounting platform 2000C includes one mating feature, and a fourth mounting platform 2000D includes three mating features. As such, each mounting platform 2000 may be configured to be compatible with a different set of button accessories such that the button accessories in the set may be configured to only be removably affixable to that mounting platform.

In another example, two of the mounting platforms may be configured in the same manner, which may differ from a configuration of another mounting platform. In such an example, a selected button accessory may be removably affixable to the two mounting platforms, but may not be removably affixable to the other mounting platform. In another example, each mounting platform may include a same number of mating features, but the mating features may be radially spaced apart differently on the different mounting platforms such that the mating features may be differently configured. Mating features of different mounting platforms may be differently configured in any suitable manner.

Continuing with FIG. 20, in some implementations, each of the plurality of mounting platforms 2000 may include a visual indicator 2002 (e.g., 2002A, 2002B, 2002C, 2002D) that indicates a selected button accessory type that is removably affixable to the mounting platform. For example, the first mounting platform 2000A includes a "Y" visual indicator 2002A. Likewise, each button accessory that is compatible to affix to the first mounting platform 2000A may include the same "Y" visual indicator. Because some button accessories may not be compatible with some mounting platforms, the visual indicators may be used to match button accessories with compatible mounting platforms. In some implementations, a visual indicator may provide instructions for aligning a button accessory with a mounting platform to affix the button accessory to the mounting platform. A mounting platform or a button accessory may include any suitable visual indicator.

In another example implementation, a game controller comprises an electronic input sensor, and a button-retention feature configured to removably affix a selected button accessory to the game controller through a magnetic attraction between the button-retention feature and the selected button accessory. The selected button accessory may be one of a plurality of differently configured button accessories removably affixable to the game controller. The selected button accessory may be configured to translate a touch applied to the selected button accessory to an actuation of the electronic input sensor when the selected button accessory is affixed to the game controller. In one example implementation that optionally may be combined with any of the features described herein, the button-retention feature includes one or more magnets, and wherein the selected button accessory is made at least partially of ferromagnetic material having a magnetic attraction to the one or more magnets. In one example implementation that optionally may be combined with any of the features described herein, the button-retention feature includes ferromagnetic material, and wherein the selected button accessory includes one or more magnets having a magnetic attraction to the ferromagnetic material. In one example implementation that optionally may be combined with any of the features described herein, the game controller further comprises a component defining a mating feature configured to interlock with a corresponding mating feature on the selected button accessory to prevent the selected button accessory from rotating while affixed to the game controller. In one example implementation that optionally may be combined with any of the features described herein, the game controller further comprises a mounting platform configured to removably receive the selected button accessory, wherein the button-retention feature is configured to removably affix the selected button accessory to the mounting platform through a magnetic attraction between the button-retention feature and the selected button accessory. In one example implementation that optionally may be combined with any of the features described herein, the button-retention feature is included in the mounting platform. In one example implementation that optionally may be combined with any of the features described herein, the mounting platform includes a mating feature configured to interlock with a corresponding mating feature on the selected button accessory to prevent the selected button accessory from rotating about the mounting platform. In one example implementation that optionally may be combined with any of the features described herein, the electronic input sensor includes a collapsible switch configured to actuate responsive to a touch force applied to the selected button accessory when the selected button accessory is affixed to the game controller. In one example implementation that optionally may be combined with any of the features described herein, the electronic input sensor includes a Hall Effect sensor, and wherein the Hall Effect sensor varies an output signal responsive to the touch applied to the selected button accessory when the selected button accessory is affixed to the mounting platform. In one example implementation that optionally may be combined with any of the features described herein, each of the plurality of differently configured button accessories produce a different magnetic field that is identifiable by the Hall Effect sensor. In one example implementation that optionally may be combined with any of the features described herein, the game controller further comprises a button identification device configured to identify the selected button accessory when the selected button accessory is affixed to the mounting platform and associate a control signal with the selected button accessory. The game controller may be configured to output the control signal responsive to actuation of the electronic input sensor while the selected button accessory is affixed to the mounting platform. Each of the plurality of differently configured button accessories may be associated with a different control signal.

In another example implementation, a controller comprises a plurality of electronic input sensors and a corresponding plurality of mounting platforms. Each mounting platform may include a button-retention feature configured to removably affix a selected button accessory to a corresponding mounting platform through a magnetic attraction between the button-retention feature and the button accessory. The selected button accessory may be one of a plurality of differently configured button accessories removably affixable to the mounting platform. The mounting platform may be configured to translate a touch applied to the selected button accessory to an actuation of a different electronic input sensor of the plurality of electronic input sensors when the selected button accessory is affixed to the mounting platform. In one example implementation that optionally may be combined with any of the features described herein, each of the plurality of mounting platforms includes a visual indicator that indicates a selected button accessory type that is removably affixable to the mounting platform. In one example implementation that optionally may be combined with any of the features described herein, the plurality of mounting platforms are identically configured such that a same selected button accessory is removably affixable to each of the plurality of mounting platforms. In one example implementation that optionally may be combined with any of the features described herein, two or more mounting platforms of the plurality of mounting platforms are differently configured such that a same selected button accessory is not removably affixable to the two or more mounting platforms. In one example implementation that optionally may be combined with any of the features described herein, each of the plurality of mounting platforms include a mating feature configured to interlock with a corresponding mating feature of a selected button accessory to prevent the selected button accessory from rotating about the mounting platform, and wherein the two or mounting platforms include differently configured mounting features.

In one example implementation that optionally may be combined with any of the features described herein, the controller further comprises a button identification device configured to, for each of the corresponding plurality of mounting platforms, identify the selected button accessory when the selected button accessory is affixed to the corresponding mounting platform and associate a control signal with the selected button accessory. The controller is configured to, for each selected button accessory affixed to a mounting platform, output the control signal associated with the selected button accessory responsive to actuation of the electronic input sensor corresponding to the selected button accessory while the selected button accessory is affixed to the mounting platform. Each of the plurality of differently configured button accessories is associated with a different control signal. In another example implementation, a game controller comprises a first electronic input sensor, a second electronic input sensor, a first mounting platform and a second mounting platform. The first mounting platform includes a first button-retention feature and a first mating feature. The first button-retention feature is configured to removably affix a first button accessory to the mounting platform through a magnetic attraction between the first button-retention feature and the first button accessory. The first mating feature is configured to interlock with a corresponding first mating feature of the first button accessory to prevent the first button accessory from rotating about the first mounting platform. The first mounting platform is configured to translate a touch applied to the first button accessory to an actuation of the first electronic input sensor when the first button accessory is affixed to the first mounting platform. The second mounting platform includes a second button-retention feature and a second mating feature. The second button-retention feature is configured to removably affix a second button accessory to the mounting platform through a magnetic attraction between the second button-retention feature and the second button accessory. The second mating feature is configured to interlock with a corresponding second mating feature of the second button accessory to prevent the second button accessory from rotating about the second mounting platform. The second mounting platform is configured to translate a touch applied to the second button accessory to an actuation of the second electronic input sensor when the second button accessory is affixed to the second mounting platform. The first mating feature of the first mounting platform is differently configured than the second mating feature of the second mounting platform such that the second button accessory is not removably affixable to the first mounting platform and the first button accessory is not removably affixable to the second mounting platform. In one example implementation that optionally may be combined with any of the features described herein, the first mounting platforms includes a first visual indicator that indicates a first button accessory type that is removably affixable to the first mounting platform and wherein the second mounting platform includes second visual indicator that indicates a second button accessory type different than the first button accessory type that is removably affixable to the second mounting platform. In one example implementation that optionally may be combined with any of the features described herein, the first mounting platform includes a first number of mating features, and wherein the second mounting platform includes a second number of mating features different than the first number of mating features.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A game controller comprising:
   an electronic input sensor; and
   a moveable mounting platform including a magnet, the moveable mounting platform configured to removably affix a selected button accessory to the game controller through a magnetic attraction between the magnet and the selected button accessory, the selected button accessory being one of a plurality of differently configured button accessories removably affixable to the game controller through magnetic attraction to the magnet, the moveable mounting platform sandwiched between the selected button accessory and the electronic input sensor when the selected button accessory is removably affixed to the moveable mounting platform, wherein the movable mounting platform including the magnet moves together with the selected button accessory relative to the electronic input sensor when the selected button accessory is pressed, and wherein the electronic input sensor generates an activation signal responsive to the movement of the moveable mounting platform.

2. The game controller of claim 1, wherein the selected button accessory is made at least partially of ferromagnetic material having a magnetic attraction to the magnet.

3. The game controller of claim 1, further comprising:
   a component defining a mating feature configured to interlock with a corresponding mating feature on the selected button accessory to prevent the selected button accessory from rotating while affixed to the game controller.

4. The game controller of claim 1, wherein the movable mounting platform includes a mating feature configured to interlock with a corresponding mating feature on the selected button accessory to prevent the selected button accessory from rotating about the mounting platform.

5. The game controller of claim 1, wherein the electronic input sensor includes a collapsible switch configured to actuate responsive to the movement of the movable mounting platform.

6. The game controller of claim 1, wherein the electronic input sensor includes a Hall Effect sensor, and wherein the Hall Effect sensor varies an output signal responsive to the movement of the movable mounting platform.

7. The game controller of claim 6, wherein each of the plurality of differently configured button accessories produce a different magnetic field that is identifiable by the Hall Effect sensor.

8. The game controller of claim 1, further comprising:
a button identification device configured to identify the selected button accessory when the selected button accessory is affixed to the movable mounting platform and associate a control signal with the selected button accessory, wherein the game controller is configured to output the control signal responsive to actuation of the electronic input sensor while the selected button accessory is affixed to the movable mounting platform, and wherein each of the plurality of differently configured button accessories is associated with a different control signal.

9. The game controller of claim 1, wherein the electronic input sensor generates the activation signal responsive to movement of the movable mounting platform toward the electronic input sensor when the selected button accessory is pressed.

10. A controller comprising:
a plurality of electronic input sensors; and
a corresponding plurality of movable mounting platforms, each movable mounting platform including a magnet, each movable mounting platform configured to removably affix a selected button accessory to the movable mounting platform through a magnetic attraction between the magnet and the selected button accessory, the movable mounting platform sandwiched between the selected button accessory and a corresponding electronic input sensor when the selected button accessory is removably affixed to the movable mounting platform, the selected button accessory being one of a plurality of differently configured button accessories removably affixable to the movable mounting platform, wherein the movable mounting platform including the magnet moves together with the selected button accessory relative to the corresponding electronic input sensor when the selected button accessory is pressed, and wherein the corresponding electronic input sensor generates an activation signal responsive to the movement of the movable mounting platform.

11. The controller of claim 10, wherein each of the plurality of movable mounting platforms includes a visual indicator that indicates a selected button accessory type that is removably affixable to the mounting platform.

12. The controller of claim 10, wherein the plurality of movable mounting platforms are identically configured such that a same selected button accessory is removably affixable to each of the plurality of movable mounting platforms.

13. The controller of claim 10, wherein two or more movable mounting platforms of the plurality of movable mounting platforms are differently configured such that a same selected button accessory is not removably affixable to the two or more movable mounting platforms.

14. The controller of claim 13, wherein each of the plurality of movable mounting platforms include a mating feature configured to interlock with a corresponding mating feature of a selected button accessory to prevent the selected button accessory from rotating about the movable mounting platform, and wherein the two or movable mounting platforms include differently configured mounting features.

15. The controller of claim 10, further comprising:
a button identification device configured to, for each of the corresponding plurality of movable mounting platforms, identify the selected button accessory when the selected button accessory is affixed to the corresponding movable mounting platform and associate a control signal with the selected button accessory, wherein the controller is configured to, for each selected button accessory affixed to a movable mounting platform, output the control signal associated with the selected button accessory responsive to actuation of the electronic input sensor corresponding to the selected button accessory while the selected button accessory is affixed to the movable mounting platform, and wherein each of the plurality of differently configured button accessories is associated with a different control signal.

16. A game controller comprising:
a first electronic input sensor;
a second electronic input sensor;
a first mounting platform including a first button-retention feature and a first mating feature, the first button-retention feature being configured to removably affix a first button accessory to the mounting platform through a magnetic attraction between the first button-retention feature and the first button accessory, the first mating feature being configured to interlock with a corresponding first mating feature of the first button accessory to prevent the first button accessory from rotating about the first mounting platform, and the first mounting platform being configured to translate a touch applied to the first button accessory to an actuation of the first electronic input sensor when the first button accessory is affixed to the first mounting platform; and
a second mounting platform including a second button-retention feature and a second mating feature, the second button-retention feature being configured to removably affix a second button accessory to the mounting platform through a magnetic attraction between the second button-retention feature and the second button accessory, the second mating feature being configured to interlock with a corresponding second mating feature of the second button accessory to prevent the second button accessory from rotating about the second mounting platform, and the second mounting platform being configured to translate a touch applied to the second button accessory to an actuation of the second electronic input sensor when the second button accessory is affixed to the second mounting platform,
and wherein the first mating feature of the first mounting platform is differently configured than the second mating feature of the second mounting platform such that the second button accessory is not removably affixable to the first mounting platform and the first button accessory is not removably affixable to the second mounting platform.

17. The game controller of claim 16, wherein the first mounting platforms includes a first visual indicator that indicates a first button accessory type that is removably affixable to the first mounting platform and wherein the second mounting platform includes second visual indicator that indicates a second button accessory type different than the first button accessory type that is removably affixable to the second mounting platform.

18. The game controller of claim 16, wherein the first mounting platform includes a first number of mating features, and wherein the second mounting platform includes a second number of mating features different than the first number of mating features.

* * * * *